United States Patent
Lin et al.

(10) Patent No.: US 10,117,299 B1
(45) Date of Patent: Oct. 30, 2018

(54) LIGHT SET CIRCUIT, LIGHT STRIP AND CONTROL APPARATUS THEREFOR

(71) Applicant: Fujian Yibao Optoelectronics Technology Co., Ltd., Nan'an (CN)

(72) Inventors: Jiayang Lin, Nan'an (CN); Baowen Lin, Nan'an (CN)

(73) Assignee: Fujian Yibao Optoelectronics Technology Co., Ltd., Nan'an (CN)

( * ) Notice: Subject to any disclaimer, the term of this patent is extended or adjusted under 35 U.S.C. 154(b) by 0 days.

(21) Appl. No.: 16/022,285

(22) Filed: Jun. 28, 2018

(30) Foreign Application Priority Data

May 2, 2018 (CN) .................. 2018 2 0642837 U
May 3, 2018 (CN) .................. 2018 2 0645655 U

(51) Int. Cl.
*H05B 33/08* (2006.01)
*H05B 37/02* (2006.01)
*A43B 3/00* (2006.01)

(52) U.S. Cl.
CPC .......... *H05B 33/086* (2013.01); *A43B 3/001* (2013.01); *H05B 33/0818* (2013.01); *H05B 33/0821* (2013.01)

(58) Field of Classification Search
CPC .............. H05B 33/08; H05B 33/0818; H05B 33/0821; H05B 33/0842; H05B 33/086; H05B 37/0227; H05B 37/029; A43B 3/001; G09G 3/14; G09G 3/32; F21V 31/005

USPC ......... 315/151–158, 224–226, 291, 307, 308
See application file for complete search history.

(56) References Cited

U.S. PATENT DOCUMENTS

| | | | | |
|---|---|---|---|---|
| 7,600,884 B2* | 10/2009 | Vitulli | ............... | H05B 33/0803 315/200 A |
| 2004/0051474 A1* | 3/2004 | Wong | ................... | A41D 27/085 315/291 |
| 2015/0296595 A1* | 10/2015 | Tseng | ................. | H05B 37/0281 315/297 |

* cited by examiner

*Primary Examiner* — Jimmy Vu
(74) *Attorney, Agent, or Firm* — Stephen R. Seccombe; Danton K. Mak; Leech Tishman Fuscaldo & Lampl

(57) ABSTRACT

A light set circuit having first, second, and third control signal lines arranged in parallel, with pairs of LEDs connected with reverse polarity between pairs of the signal lines. In operation, control apparatus applies a control signal level between one and either of the other signal lines, the remaining control signal line being kept in a floating state for activating a selected one of the four LEDs. A light strip includes plural light set circuits spaced along the control signal lines. In another variation, first and second light points are spaced along the three control signal lines, each including three different color LEDs respectively, there being three pairs of LEDs connected with reverse polarity between pairs of the signal lines for activating a selected one of the six LEDs by applying a control signal level between two of the signal lines, keeping the remaining signal line in a floating state.

27 Claims, 8 Drawing Sheets

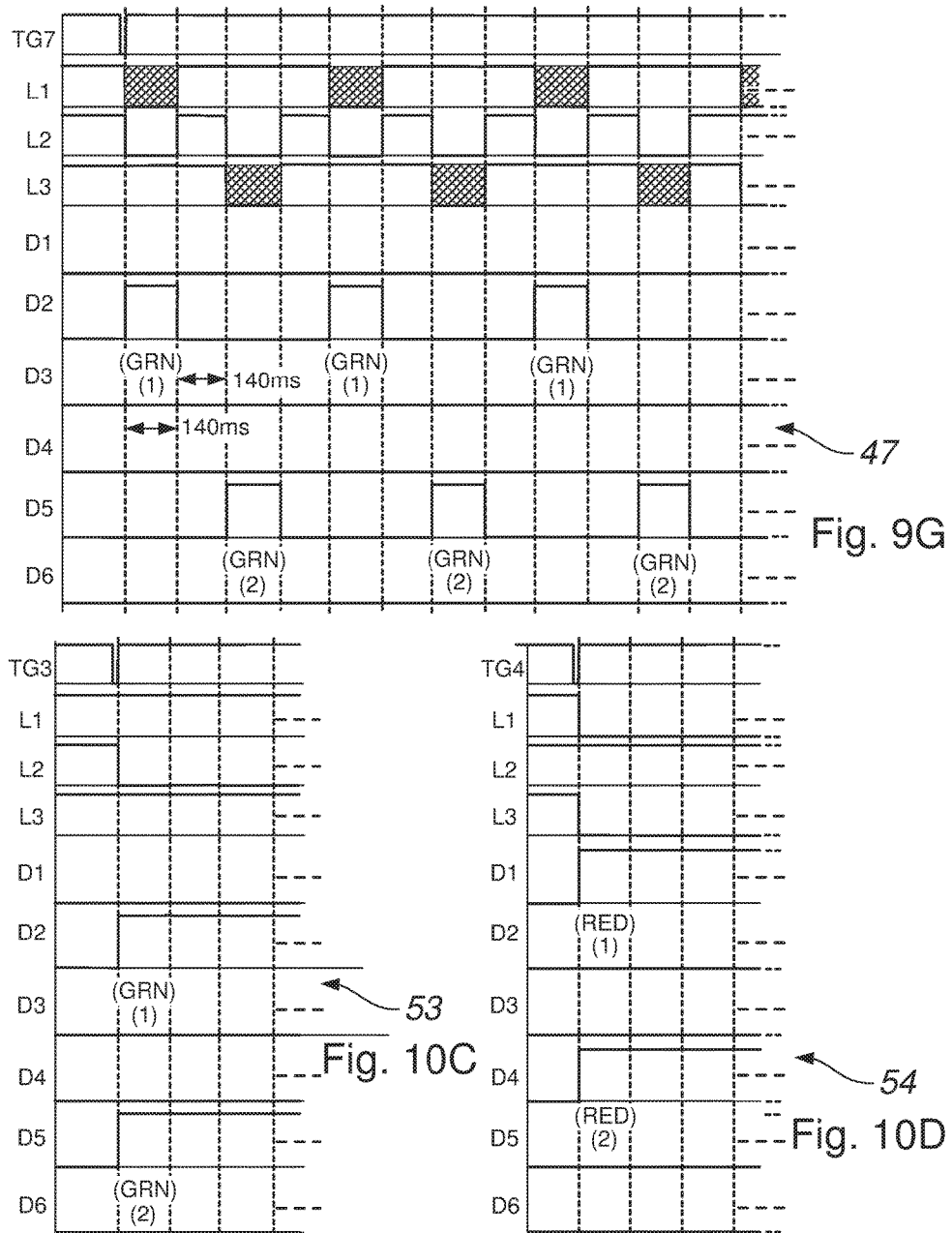

LIGHT SET CIRCUIT, LIGHT STRIP AND CONTROL APPARATUS THEREFOR

CROSS-REFERENCE TO RELATED APPLICATIONS

The present Application claims priority from Chinese Patent Application No. 201820645655.8 titled "A light set circuit, a light strip and a light source component," filed May 3, 2018 and Chinese Patent Application No. 201820642837.X filed May 2, 2018, titled "A light set circuit, a light strip and a light source component," the contents of which are incorporated in this disclosure by reference in their entirety.

BACKGROUND

The present invention relates to lighting technology, and more particularly to a light set circuit, a light strip and a control apparatus for driving the light set. Common light strips typically include an array of LEDs soldered on wires or conductors of a flexible ribbon board. Such light strips can be inserted into a translucent or transparent tubular member, or directly molded into a device. When the light strip is connected to a power supply, it will emit light, which can look like a light band. It is known that the light color can be changeable and/or dimmable. The light color change can be controlled, with monochrome and RGB effects selected to provide colorful visual effects. Such light strips have been widely used in the decoration and lighting of buildings, bridges, roads, courtyards, furniture, automobiles, signs, etc.

However, in many applications the number of wires or other conductors and circuitry needed in the prior art for a desired effect becomes prohibitive in that each aspect of lighting typically requires a separate control line, plus a common (ground) return. For example in the prior technology, a typical light strip control chip has two, three or four control terminals. Multiple light points are set between these terminals, and each light point includes one or more LED lights, which are turned on or off according to the control level of a corresponding control terminal. When the display of a specific mode is needed, the control signal for a particular aspect needs to be set specially, and LED lights of the light point generally cannot be individually turned on. Alternatively, the control chip can also be provided with enough control terminals so that each control terminal corresponds to one light of each light point. That way the control chip can control the lights of the light points individually, which can provide a greater variety of flashing modes, but the cost is markedly increased for larger numbers of light point lights.

Thus there is a need for an improved circuitry and control apparatus that avoids the need for separate wires for each aspect of a light strip display.

SUMMARY

The present invention meets this need by providing a light set circuit that includes first, second, and third control signal lines arranged in parallel, and at least four LED light sources that are variously directly connected between the control signal lines in such a way that each of the light sources can be individually turned on according to control levels of the control signal lines. More generally, the present invention provides light circuits having a number of light sources that can be individually turned on using fewer control signal lines than the number of light sources in each light circuit.

In one aspect of the invention, the light set circuit includes four polarized light sources, two of the light sources being connected in reverse polarity between first and second control signal lines, the other two light sources being connected in reverse polarity between a third control signal line and the second control signal line. One of the light sources is selectively activated when opposite signals are applied between the first and second control signal lines, the third control signal line being kept in a floating state, a different light source being activated when the signals are reversed with the third control signal line floating. Another of the light sources is activated when opposite signals are applied between the second and third control signal lines, the first control signal line being kept in the floating state, and a still different light source is activated when these signals are reversed with the first control signal line remaining in the floating state. The four light sources can be first, second, third, and fourth LED light sources, the first and second LEDs being connected in reverse polarity with each other between the second and third control signal lines, the third and fourth LED light sources being connected in reverse with each other between the first and second control signal lines.

Each LED light source has positive and negative terminals. In one arrangement the positive terminal of the first LED light source is connected to the third control signal line, and the negative terminal of the first LED light source is connected to the second control signal line, the positive terminal of the second LED light source being connected to the second control signal line, the negative terminal of the second LED light source being connected to the third control signal line; the positive terminal of the third LED light source is connected to the first control signal line, the negative terminal of the third LED light source being connected to the second control signal line; the positive terminal of the fourth LED light source is connected to the second control signal line, and the negative terminal of the fourth LED light source is connected to the first control signal line.

A plurality of the light set circuits that are sequentially connected along just the first, second, and third control signal lines can form a light strip in which the four light sources of each light set circuit can be selectively individually activated. Preferably the light set circuits have equal complements of the LED light sources and corresponding connections to the control signal lines at respective light points. A combination of the light strip with a control apparatus having three control outputs that are respectively connected to the three control signal lines can be configured with the control apparatus selectively applying opposite signals of selected polarity between the first and second control signal lines, the third control signal line being in the floating state, and alternatively, applying opposite signals of selected polarity between the second and third control signal lines, the first control signal line being kept in the floating state.

The control apparatus can include a connected memory, a control pulse generating circuit and a processor, the memory storing flashing mode control information that defines plural flashing modes of the light strip, the processor transferring the flashing mode control information via the control pulse generating circuit as pulse control signals to the first, second, and third control signal lines of the light strip. The memory, control pulse generating circuit and processor can be formed on a control chip that further includes an I/O port, a trigger switch being connected to the I/O port for triggering the processor to transfer flashing mode control information from the memory to the control pulse generating circuit, subsequent activations of the trigger switch triggering transfers of different flashing mode control information to the pulse generating circuit.

Preferably the trigger switch is the flicker switch. As used herein, a flicker switch is a motion activated inertia switch that can be installed in association with the light strip in an article of clothing such as a wearer's shoe. Preferably at least one of the flashing modes is a following or flowing flashing sequence mode. Further preferably, two of the flashing modes are flashing sequences of opposite directions.

In another variation of the present invention there are first and second light points sequentially arranged along the three control signal lines, with a control signal level being applied to two of the three control signal lines as described above, and the remaining control signal line being kept in a floating state. Each light point preferably includes three different color LED light sources, respectively; the first light point including first, second and third LED light sources, the second light point includes fourth, fifth and sixth LED light sources.

In one arrangement the positive terminal of the first LED light source is connected to the second control signal line, the negative terminal of the first LED light source is connected to the first control signal line; the positive terminal of the second LED light source is connected to the second control signal line, the negative terminal of the second LED light source being connected to the third control signal line. The positive terminal of the third LED light source is connected to the first control signal line, the negative terminal of the third LED light source being connected to the third control signal line. The negative terminal of the fourth LED light source is connected to the second control signal line, the positive terminal of the fourth LED light source being connected to the third control signal line; the negative terminal of the fifth LED light source is connected to the second control signal line, the positive terminal of the fifth LED light source being connected to the first control signal line. The negative terminal of the sixth LED light source is connected to the first control signal line, the positive terminal of the sixth LED light source being connected to the third control signal line.

Preferably, the first and second light points each include red, green and blue LED light sources. More preferably, the first and the fourth LED light sources are of the same color, the second and fifth LED light sources being of the same color, and the third and sixth LED light sources are of the same color.

A light strip can also be formed with plural complements of the first and second light points sequentially connected along the three control signal lines. Preferably these light set circuits also have the same complement of three LED light sources and connection structure in each light point.

Additionally, the combination of light strip and control apparatus can be incorporated in a useful article such as an article of clothing being a shoe lower portion.

The present invention also provides a corresponding combination of control apparatus and the light strip having multiples of the first and second light points, the control apparatus including the control chip connected to the three control signal lines of the light strip.

The present invention advantageously provides a simple, low cost structure for versatile control of plural light sources using only three control signal lines to control up to six LED light sources in each of multiple light sets. Each LED light of every set can be turned on alone, and the combination with the control apparatus can realize various flashing modes such as a flowing or following flash.

DRAWINGS

These and other features, aspects, and advantages of the present invention will become better understood with reference to the following description, appended claims, and accompanying drawings, where:

Figure 7:
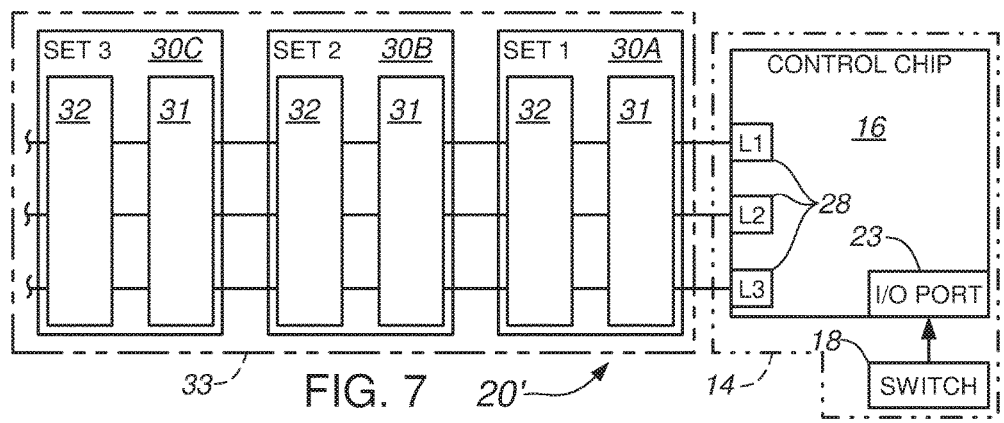
FIG. 7 is a block diagram as in FIG. 2, the combination incorporating the light set circuits of FIG. 6.

FIGS. 9A, 9B, 9C, 9D, 9E, 9F, and 9G are exemplary timing diagrams for operational sequences of the combination of FIG. 7; and FIGS. 10A, 10B, 10C, and 10D are further exemplary timing diagrams for operational sequences of the combination of FIG. 7.

DESCRIPTION

The present invention is directed to a light set circuit that is particularly versatile yet inexpensive to produce, alone and in combination with suitable control apparatus. With reference to FIGS. 1, 2, 3A, 3B and 4 of the drawings, a light set circuit 10 includes four polarized light sources and three control signal lines, designated L1, L2, and L3, the light sources being connected in parallel pairs as described herein. Exemplary polarized light sources are LEDs, and four such LED light sources, designated D1, D2, D3, and D4, are connected to the three control signal lines. The LED light sources D1 and D2 are connected in reverse with each other between the second control signal line L2 and the third control signal line L3. The other two LED light sources D3 and D4 are connected in reverse with each other between the first control signal line L1 and the second control signal line L2. More particularly, the positive terminal of the first LED light source D1 is connected with the third control signal line L3, and the negative terminal of the first LED light source D1 is connected to the second control signal line L2. The positive terminal of the second LED light source D2 is connected to the second control signal line L2, and the negative terminal of the second LED light source D2 is connected to the third control signal line L3. Similarly, the positive terminal of the third LED light source D3 is connected to the first control signal line L1, the negative terminal of the third LED light source D3 being connected to the second control signal line L2. Finally, the positive terminal of the fourth LED light source D4 is connected to the second control signal line L2 and the negative terminal of the fourth LED light source D4 is connected to the first control signal line L1.

Figure 2:
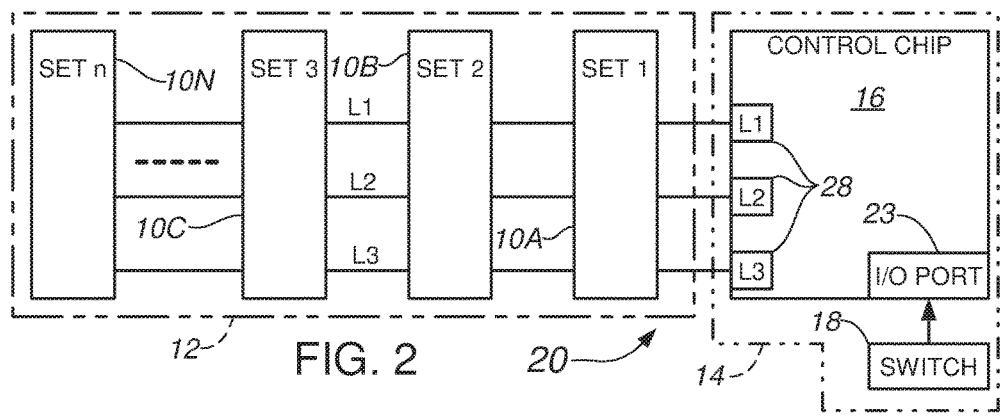
FIG. 2 is a block diagram of a light strip incorporating light set circuits of FIG. 1 in combination with a control apparatus in further accordance with the present invention.
Figure 4:
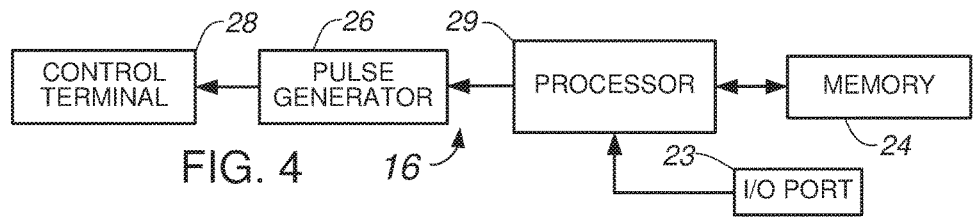
FIG. 4 is a schematic block diagram of the control apparatus of FIG. 2.

Plural counterparts of the light set circuit 10 are connected in parallel to the control signal lines L1, L2, and L3 to form a light strip 12 as indicated by dashed lines in FIG. 2, the individual light sets being designated 10A, 10B, 10C . . . 10N. The light strip 12 is connected to control apparatus 14 to form a light strip combination 20, the control apparatus 14 comprising a control chip 16 and a trigger switch 18 for activating the control chip 16. More particularly as shown in FIG. 4, the control chip 16 includes an I/O port 23, a memory 24, three pulse generating circuits 26 (one such being shown), three control terminals 28 (one such being shown), and a processor 29. It will be understood that there can be a single pulse generating circuit 26 having three channels for separately controlling the three control terminals 28. The control terminals 28 are connected, respectively, to the control signal lines L1, L2, and L3 as indicated in FIG. 2.

The trigger switch 18 is connected with the processor through the I/O port 23. The processor 29 responds to operation of the trigger switch 18 by producing a trigger signal TG for calling flashing mode control information corresponding to a predetermined flashing mode from the memory 24. Subsequent activations of the trigger switch 18 produce additional trigger signals TG that call from the memory 24 flashing mode control information that is different from a current flashing mode. Preferably the switch 22 is the flicker (momentary inertia) switch.

The processor 29 acquires flashing mode control information from the memory 24 and transfers the information to the respective control pulse generating circuits 26 (or independent channels of a single pulse generating circuit), and corresponding pulse control signals are generated for each of the control signal lines L1, L2, and L3 of the light strip 12. Thus, the light strip 12 can be controlled to flash in a particular pattern or mode.

In operation, control signal levels of opposite polarity are applied to two of the control signal lines, L2 and L3 for example, and the remaining control signal line L1 is kept in a floating state. Alternatively, control signal levels of opposite polarity are applied to the first and second control signal lines L1 and L2, and the third control signal line L3 is kept in a floating state. Thus, four active state combinations of the light set circuit can be achieved according to the present invention as shown in Table 1 below, in which a high level is represented by a 1, a low level is represented by a 0, the floating state is represented by a dash (-), and a check mark (√) represents the corresponding LED (D1, D2, D3, or D4) being on. Inactivation of all four of the LEDs is achieved in an inactive state 0 by any of several control signal line combinations, such as each of the control signal lines L1, L2, and L3 being at the same potential, the high level (1) for example.

TABLE 1

| State | Control signal line | | | LED light source | | | |
|---|---|---|---|---|---|---|---|
| | L1 | L2 | L3 | D1 | D2 | D3 | D4 |
| State 0 | 1 | 1 | 1 | | | | |
| State 1 | — | 0 | 1 | √ | | | |
| State 2 | — | 1 | 0 | | √ | | |
| State 3 | 1 | 0 | — | | | √ | |
| State 4 | 0 | 1 | — | | | | √ |

Figure 3A:
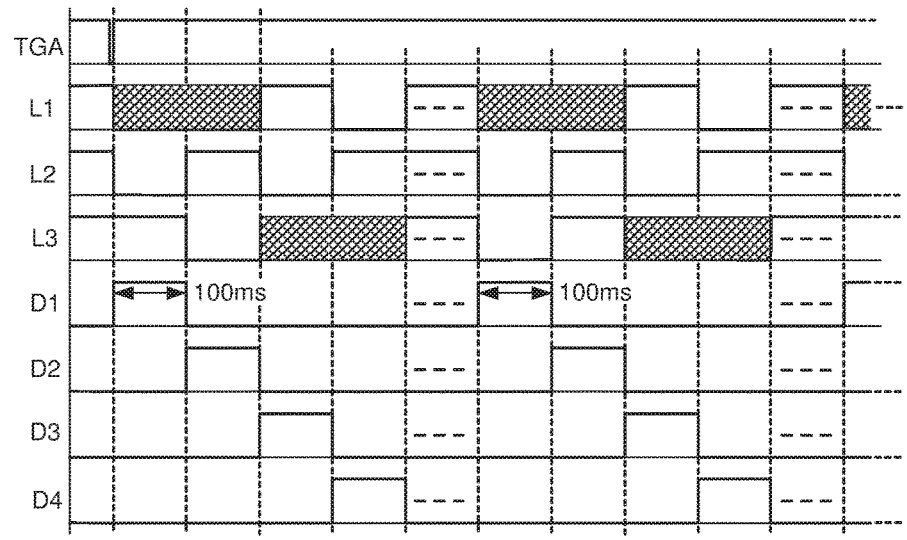
FIGS. 3A and 3B are exemplary timing diagrams of the combination of FIG. 2.

Thus as shown in Table 1, the light set circuit can turn on each LED light source D1-D4 separately by applying opposite control signal levels to two control signal lines L2 and either L1 or L3 of only three control signal lines L1, L2, and L3. Waveforms for an exemplary following flash sequence 21 for the light strip 12 are shown in FIG. 3A, wherein the control signal lines are driven sequentially and repetitively in the state combinations 1 through 4 of Table 1, as further described below. As described above, each light set circuit 10 includes four light points (D1, D2, D3, and D4), each corresponding to an LED light source; thus there are 4n LED light sources or light points in the entire light strip 12, where n is the number of the light set circuits 10.

Figure 1:
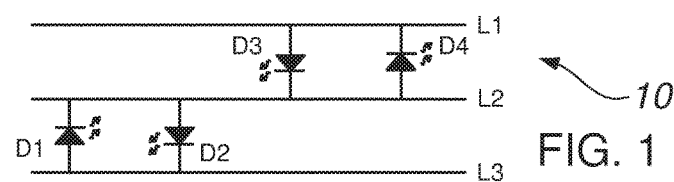
FIG. 1 is a circuit diagram of a light set circuit according to the present invention.

In a preferred example of the present invention, the plurality of light set circuits 10 of the light strip 12 have the same complement of LED light sources and the same connection structure of the control signal lines at the corresponding light sources. For example, in the light strip 12 of FIG. 2 using the light set circuits as shown in FIG. 1, the positive terminals of the first LED light sources D1 are all connected with the third control signal line L3, and the negative terminals of the first LED light sources D1 are all connected to the second control signal line L2. Similarly, the positive terminals of the second LED light sources D2 are all connected to the second control signal line L2 and the negative terminals of the second LED light sources D2 are all connected to the third control signal line L3. Likewise, the positive terminals of the first LED light sources D3 are all connected with the third control signal line L1, the negative terminals of the first LED light sources D3 are all connected with the second control signal line L2. Moreover, the positive terminals of the second LED light sources D4 are all connected to the second control signal line L2 and the negative terminals of the second LED light sources D4 are all connected with the third control signal line L1. In this way, the first LED light sources D1 of the plurality of light set circuits 10 have the same flashing/lighting operation. The other LED light sources D2, D3, D4 of the plurality of light set circuits 10 also have the same flashing/lighting operation of their own. By activation of the control signal lines L1, L2, and L3 sequentially in the states 1 through 4 in Table 1, the four LED light sources in each light set circuit 10 sequentially flash and cycle according to their placement along the light strip, as shown in FIG. 3A: D1→D2→D3→D4, this following flash sequence 21 being imitated by operation of the trigger switch 18 for producing a trigger pulse TGA as described above. This sequence is preferably repeated a predetermined number of times or indefinitely as indicated by dashed lines ( - - - ) in FIG. 3A. A subsequent trigger signal TGB preferably initiates a different flash sequence, such as a reverse flash sequence 22 that activates D4→D3→D2→D1→etc. as further shown in FIG. 3B. Thus, the entire light strip 12 can produce a visual effect similar to a following flashing display, the LED light sources flashing from one side to the other side of the light strip, in either or both directions.

Figure 3B:
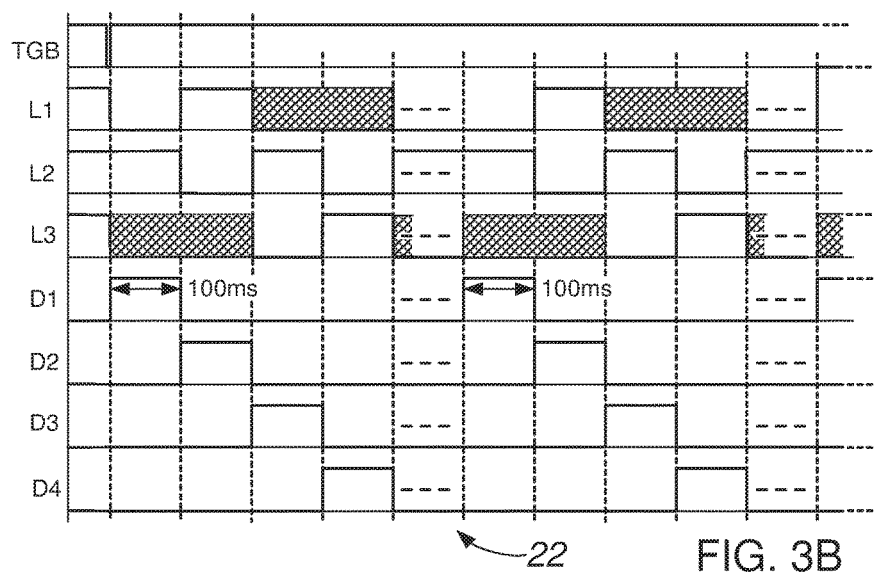

Of course, those skilled in this field can understand that according to the above table, a variety of flashing modes or sequences can also be defined for the light strips, the following flashing display mode of FIGS. 3A and 3B described above being only exemplary, and these sequences can be arranged in any order in response to repeated activations of the trigger switch 18.

In the exemplary following flashing display mode control timing shown in FIGS. 3A and 3B, there are pulse intervals of 100 ms duration, with the LED light sources being activated sequentially in successive intervals, and repeated in subsequent intervals that are represented by dashed lines (- - -), the sequence being repeated a predetermined number of times, or until interrupted by another activating trigger signal TG.

Figure 6:
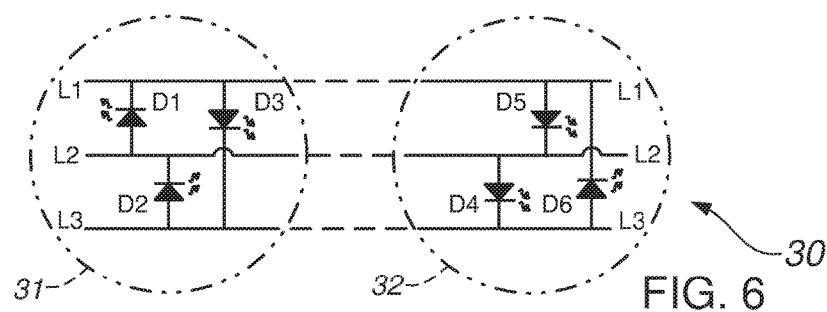
FIG. 6 is a circuit diagram showing an alternative configuration of the light set circuit of FIG. 5.
Figure 5:
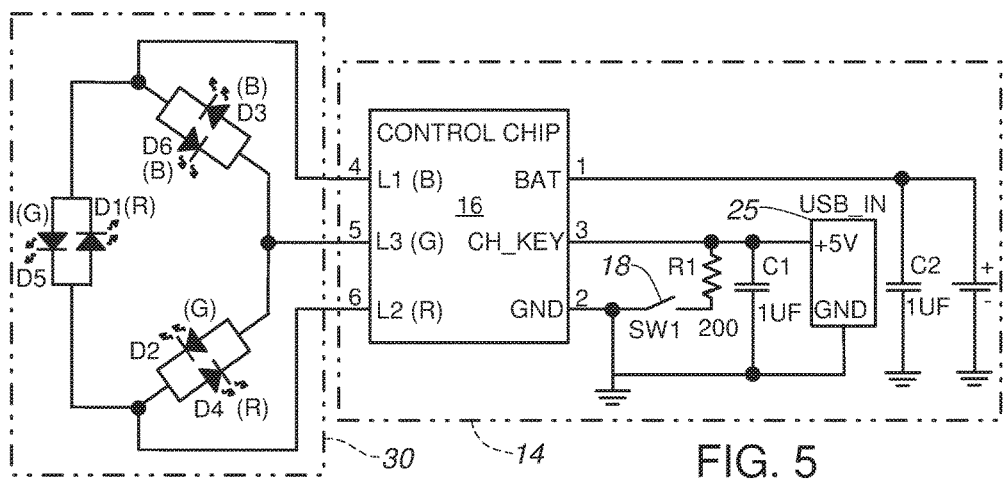
FIG. 5 is a circuit diagram showing an alternative configuration of the light set circuit of FIG. 1 and further detail of the control apparatus of FIG. 2.

With further reference to FIGS. 5, 6, and 7, an alternative configuration of the light set circuit, designated 30, includes the three control signal lines L1, L2, and L3, and an additional pair of LED light sources, designated D5 and D6, that are connected in reverse with each other between the first control signal line L1 and the third control signal line L3. FIG. 5 further shows the control apparatus 14 including a USB_IN socket 25 by which the battery of the apparatus can be charged through suitable conventional circuitry (not shown). Preferably, the LED light sources are arranged separately in two light points (a first light point 31 and a second light point 32) that are connected between the three control signal lines as shown in FIG. 6. Pairs of the light points 31 and 32 form respective light set circuits, namely set 1 (30A), set 2 (30B), and set 3 (30C) being connected in sequence along the three control signal lines L1, L2, and L3 to form a counterpart of the light strip 12, designated 33, as shown in FIG. 7. Each of the light points 31 and 32 preferably includes three different color LED light sources.

Specifically, each light point includes three LED light sources, the first light point 31 including the light sources D1, D2 and D3. The positive terminal of the light source D1 is connected to the second control signal line L2, and the negative terminal of the light source D1 is connected to the first control signal line L1. The positive terminal of the light source D2 is connected to the third control signal line L3, and the negative terminal of the light source D2 is connected to the second control signal line L2. The positive terminal of the light source D3 is connected to the first control signal line L1, and the negative terminal of the light source D3 is connected to the third control signal line L3.

The second light point 32 includes the light source D4, the light source D5, and the light source D6. The positive terminal of the light source D4 is connected to the second control signal line L2, and the negative terminal of the light source D4 is connected to the third control signal line L3. The negative terminal of the light source D5 is connected to the second control signal line L2, and the positive terminal of the light source D5 is connected to the first control signal line L1. The negative terminal of the light source D6 is connected to the first control signal line L1, and the positive terminal of the light source D6 is connected to the third control signal line L3.

In the light set circuit 30 of FIG. 6, three LED light sources D1, D2, D3 of the first light point 31 are preferably different color LED light sources. Similarly, three LED light sources D4, D5, D6 of the second light point 32 are also different color LED light sources. Preferably, each light point includes a red LED light source, a green LED light source and a blue LED light source. The light source D1 and the light source D4 are preferably the same color, which can be red, the light source D2 and the light source D5 are also preferably the same color, which can be green, and the light source D3 and the light source D6 are of the same color, which can be yellow or blue.

As further shown in FIG. 7, the control signal lines L1, L2, and L3 are connected to the control chip 16 of a counterpart of the control apparatus 14, more particularly to corresponding terminals 28 as described above. In operation as described above, control signal levels of opposite polarity are applied to two control signal lines, and the remaining control signal line is kept in a floating state for individually activating selected ones of the six light points or sources D1-D6 in the configuration of FIGS. 5, 6, and 7.

Figure 8:
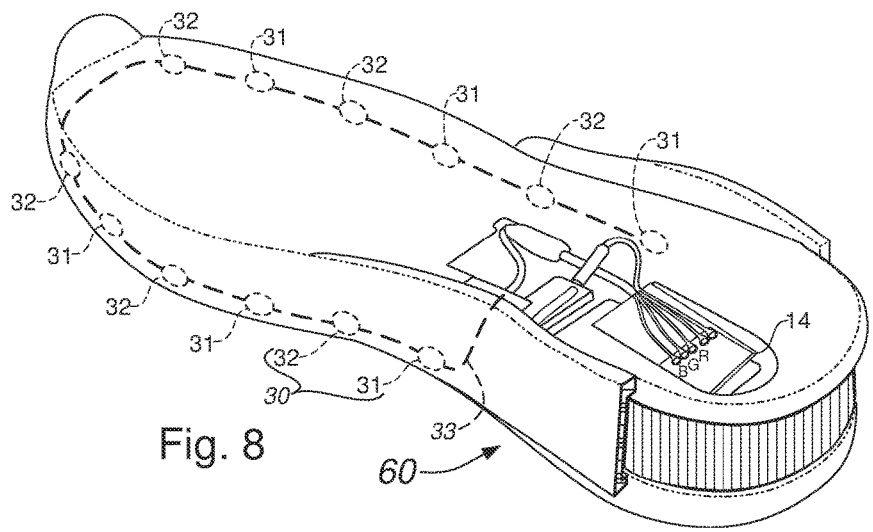
FIG. 8 is an oblique side perspective view of a lower shoe portion incorporating the light strip and control apparatus of FIG. 7.

With further reference to FIG. 8, the light strip combination 20 of FIG. 2 or the light strip combination 20' of FIG. 7 can be incorporated in a useful article, such as an article of clothing, one such article being a shoe lower portion 60 as shown in FIG. 8. The control apparatus 14 is located within the shoe lower portion 60 in a conventional manner, the light strip 33 extending proximate a perimeter portion within the shoe lower portion 60 that is sufficiently translucent to be seen when activated.

Exemplary flash sequences for this configuration are described below with further reference to FIGS. 9A-G. Particularly, each of the six LED light sources D1-D6 can be individually activated in corresponding states 1-6 according to Table 2 below, the symbols therein corresponding to those of Table 1 above, additional columns of Table 2 indicating exemplary colors and light points of activation. The column labeled Color-Point A reflects the light sources D1 and D4 being red, the light sources D2 and D5 being green, and the light sources D3 and D6 being blue. The column labeled Color-Point B reflecting the light sources D5 and D6 being changed to blue and green, respectively. It will be further understood that the polarities of the light sources D2 and D4 can be reversed from that shown in FIG. 6, being activated when the signal control lines L1, L2, and L3 are driven, respectively in state 3 (- 0 1) and state 2 (- 1 0).

TABLE 2

| | Control signal line | | | First light point | | | Second light point | | | Color- | Color- |
|---|---|---|---|---|---|---|---|---|---|---|---|
| State | L1 | L2 | L3 | D1 | D2 | D3 | D4 | D5 | D6 | Point A | Point B |
| State 0 | 1 | 1 | 1 | | | | | | | | |
| State 1 | 0 | 1 | — | √ | | | | | | Red-1 | Red-1 |
| State 2 | — | 1 | 0 | | | | √ | | | Red-2 | Red-2 |
| State 3 | — | 0 | 1 | | √ | | | | | Grn-1 | Grn-1 |
| State 4 | 1 | 0 | — | | | | | √ | | Grn-2 | Blu-2 |
| State 5 | 1 | — | 0 | | | √ | | | | Blu-1 | Blu-1 |
| State 6 | 0 | — | 1 | | | | | | √ | Blu-2 | Grn-2 |

As shown in Table 2, the light set circuit 30 can turn on each LED light source D1-D3 of the first light point 31 and each LED light source D4-D6 of the second light point 32 separately by applying the control level to two control signal lines of only three control signal lines L1-L3, the remaining control line being kept on a floating state.

Similarly to the above-described exemplary configuration of FIGS. 1-4, the light set circuits 30, individually designated 30A (Set 1), 30B (Set 2), and 30C (Set 3), form a counterpart of the light strip 12, designated 33, as shown in the dashed box in FIG. 7. It will be understood that additional light set circuits 30 can be connected to the same control signal lines L1, L2, and L3 of the light strip 32. Each light set circuit 30 includes the two light points 31 and 32. Thus there are 2n light points in the entire light strip 33, where n is the number of the light set circuits 30 and is greater than 1, and each light point including three LED light sources, a total of 6n light sources.

Preferably, the plurality of light set circuits 30 have identical counterparts of the three LED light sources in respective ones of the light points 31 and 32, and the same connection structure to the control signal lines at the corresponding light points. For example, in the light set circuits 30 as shown in FIG. 6, the first light point 31 includes the light source D1, the light source D2 and the light source D3. The positive terminal of the first LED light source D1 is connected to the second control signal line L2, and the negative terminal of the first LED light source D1 is connected to the first control signal line L1. The positive terminal of the light source D2 is connected to the third control signal line L3, and the negative terminal of the D2 light source is connected to the second control signal line L2. The positive terminal of the light source D3 is connected to the first control signal line L1, and the negative terminal of the light source D3 is connected to the third control signal line L3. The second light point 32 includes the light source D4, the light source D5, and the light source D6. The negative terminal of the light source D4 is connected to the third control signal line L3, and the positive terminal of the light source D4 is connected to the second control signal line L2. The negative terminal of the light source D5 is connected to the second control signal line L2, and the positive terminal of the light source D5 is connected to the first control signal line L1. The negative terminal of the light source D6 is connected to the first control signal line L1, and the positive terminal of the light source D6 is connected to the third control signal line L3. Thus, the first and second light points of the plurality of light set circuits have the same flashing or lighting mode.

Figures 9A, 9B:
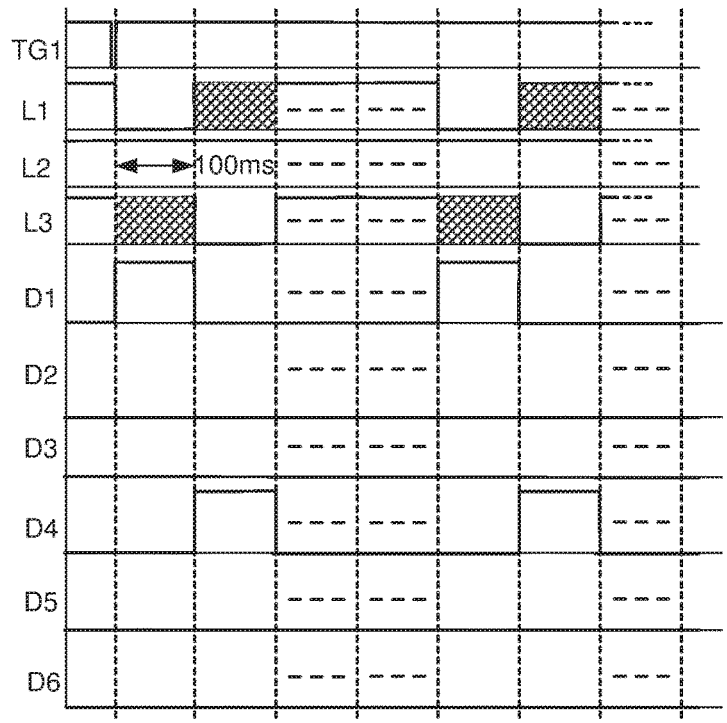
Figure 9C:
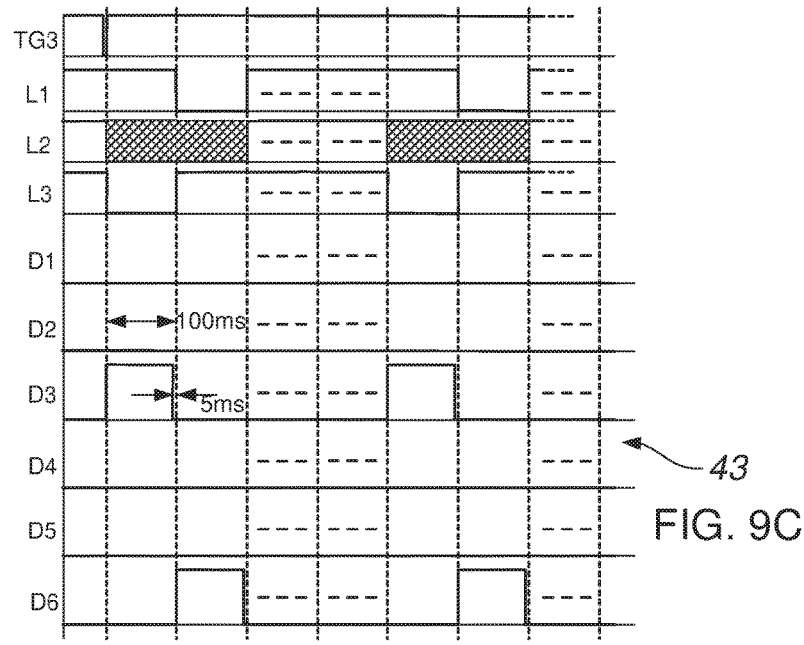

According to the control state sequence in the Table 2 above, light sources of the first light point and the same color ones of the second light point can be controlled to flash alternately on the light strip 32. For example, when the light color of the light source D1 is the same as that of the light source D4, the light color of the light source D2 is the same as that of the light source D5, and the light color of the light source D3 is the same as that of the light source D6 according to the Color-Point A column of Table 2, the LED light sources can flash and cycle alternately in the same color by a first flash sequence 41 of D1→D4 as shown in FIG. 9A, by a second flash sequence 42 of D2→D5 as shown in FIG. 9B, or by a third flash sequence 43 of D3→D6 as shown in FIG. 9C. When the colors of the light sources D5 and D6 are reversed as described above according to the Color-Point B column of Table 2, the same result for the flash sequence 43 is obtained by reversing activation of the signal control lines L1, L2, and L3 between the State 4 (1 0 -) and the state 6 (0 - 1). Thus the entire light strip can produce a visual effect similar to the flowing or following flashing, and the LED light sources flash from one side to the other side of the light strip 32.

Figure 9D:
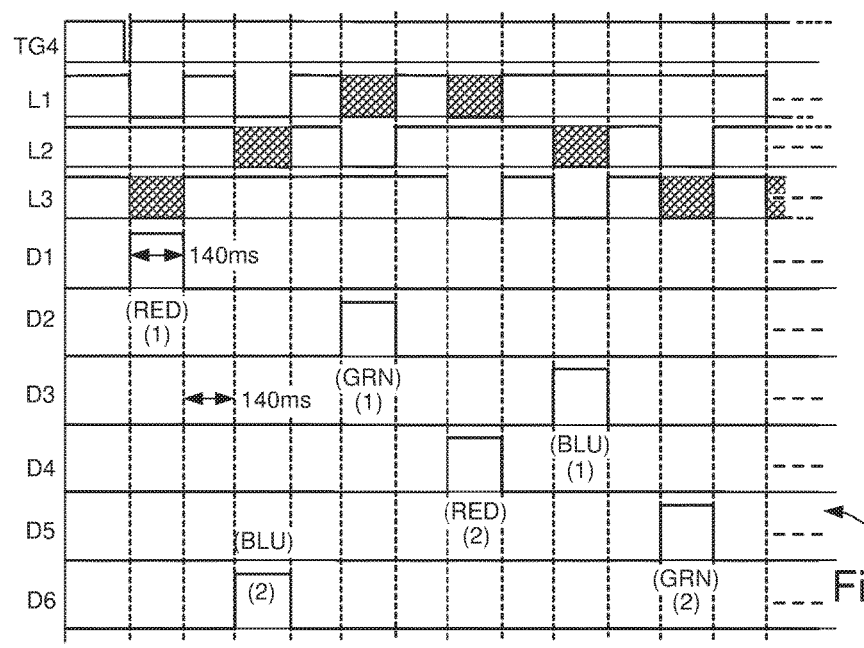

FIG. 9D further shows a fourth flash sequence 44 wherein, at intervals of 140 ms, the light sources D1, D6, D2, D4, D3, and D5 are activated in sequence, separated by inactive intervals that are also of 140 ms duration. Using the exemplary combination of Color-Point A in Table 2, the sequence is red, light point 31 . . . blue, light point 32 . . . green, light point 31 . . . red, light point 32 . . . blue, light point 31 . . . green, light point 32.

Figure 9E:
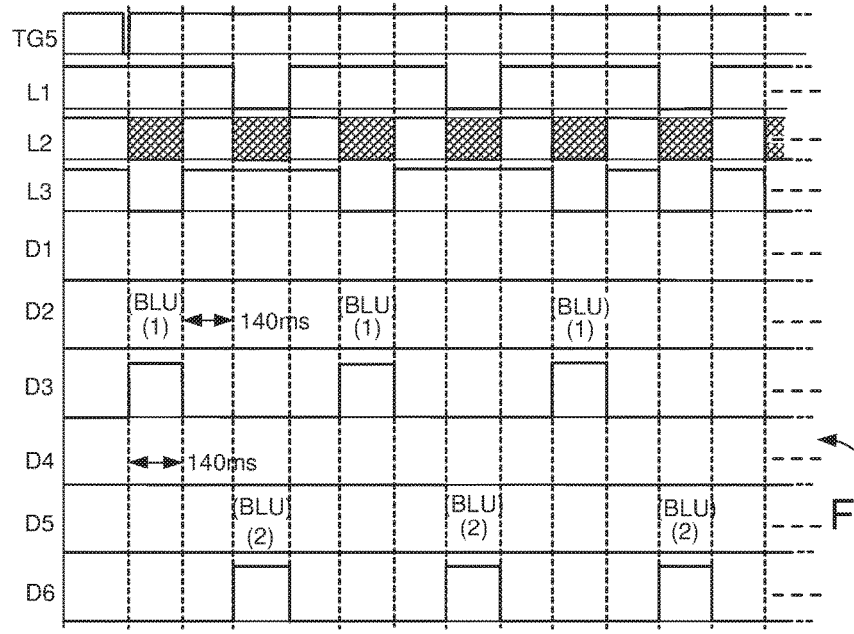
Figure 9F:
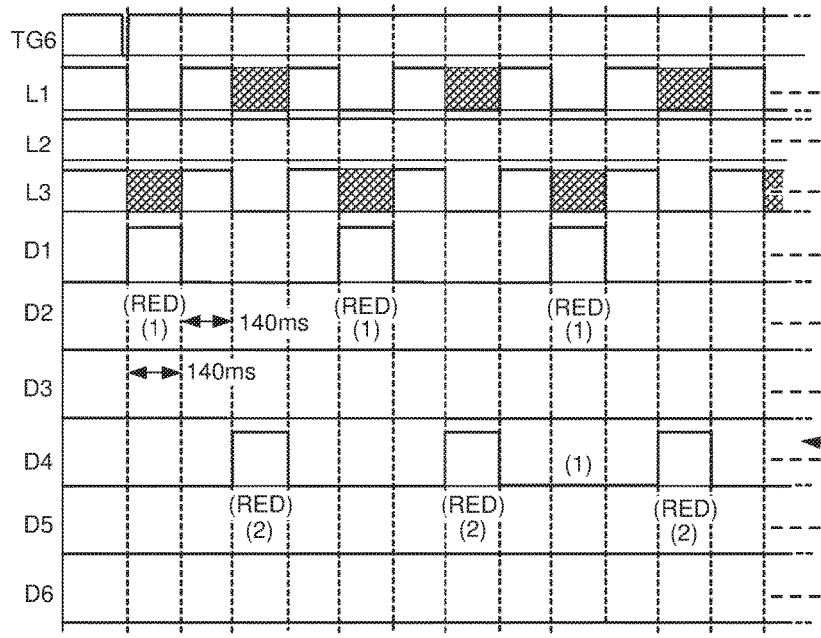

FIG. 9E shows a fifth flash sequence 45, also at intervals of 140 ms, the light sources D1, D4, D1, D4, etc, are alternately activated, also interspersed with inactive intervals of 140 ms. Again, using the exemplary color combination of Color-Point A in Table 2, the sequence is blue, light point 31 . . . blue, light point 32 . . . blue, light point 31 . . . blue, light point 32, etc. FIG. 9F shows another and sixth flash sequence 46, again at intervals of 140 ms, the light sources D3, D6, D3, D6, etc, are alternately activated, interspersed with inactive intervals of 140 ms. Once again, using the exemplary color combination of Color-Point A in Table 2, the sequence is red, light point 31 . . . red, light point 32 . . . red, light point 31 . . . red, light point 32, etc. FIG. 9G shows still another flash sequence 47, also at intervals of 140 ms, the light sources D2, D5, D2, D5, etc, are alternately activated, interspersed with inactive intervals of 140 ms. Once again, using the exemplary color combination of Color-Point A in Table 2, the sequence is green, light point 31 . . . green, light point 32 . . . green, light point 31 . . . green, light point 32, etc.

The memory 24 of FIG. 4 as described above holds data defining the flashing mode information respectively corresponding to the flashing modes of the light strip 32, such as the flowing flashing mode control information as shown in FIGS. 9A-9G, the control signal lines L1, L2, and L3 being driven as described above in connection with FIG. 4. More particularly, a first activation of the trigger switch 18 produces a first trigger pulse TG1, initiating the first flash sequence 41 as shown in FIG. 9A, in which there is alternating flashing of the (red) LED light sources D1 and D4, respectively in the first and second light points 31 and 32 of the light set circuit of FIG. 6. A second activation of the trigger switch 18 produces a second trigger pulse TG2 that initiates the second flash sequence 42 as shown in FIG. 9B, in which there is alternating flashing of the (green) LED light sources D2 and D5, again respectively in the first and second light points 31 and 32. Similarly, a third activation of the trigger switch 18 produces a third trigger pulse TG3, initiating the third flash sequence 43 as shown in FIG. 9C, in which there is alternating flashing of the (blue) LED light sources D3 and D6, also respectively in the first and second light points 31 and 32. In like manner, additional activations of the trigger switch 18 can produce fourth, fifth, sixth, and seventh trigger pulses TG4, TG5, TG6, and TG7, for initiating the flash sequences 44, 45, 46, and 47, as respectively shown in FIGS. 9D, 9E, 9F, and 9G.

Of course, those skilled in this field of art can understand that according to the above Table 2, a variety of flashing modes or sequences can also be defined for both the light strip 12 and the light strip 32. The flowing flashing modes mentioned above are only exemplary. Also any number of the sequences of FIGS. 9A-9G can be stored in the memory 24 of the control apparatus 14, and in any order.

The present invention additionally enables flash sequences in which selected pairs of the light sources of the light set circuit 30 can be simultaneously activated as described below with further reference to FIGS. 10A, 10B, 10C, and 10D. In addition to the individual activations of four different LED light sources as described above in the light set circuit 10 of FIG. 1 and of six different LED light sources in the light set circuit 30 of FIG. 5, the present invention enables simultaneous activation of selected pairs of the LED light sources as described herein with further reference to FIGS. 10A, 10B, 10C, and 10D, and Table 3 below.

TABLE 3

| State | Control signal line | | | First light point | | | Second light point | | | Colors A (1) (2) | Colors B (1) (2) |
| --- | --- | --- | --- | --- | --- | --- | --- | --- | --- | --- | --- |
|  | L1 | L2 | L3 | D1 | D2 | D3 | D4 | D5 | D6 | | |
| State 7 | 0 | 1 | 1 | √ | | | | | √ | Red-Blu | Red-Grn |
| State 8 | 1 | 0 | 1 | | √ | | | √ | | Grn-Grn | Grn-Blu |
| State 9 | 1 | 1 | 0 | | | √ | √ | | | Blu-Red | Blu-Red |
| State 10 | 1 | 0 | 0 | | | √ | √ | | | Blu-Grn | Blu-Blu |
| State 11 | 0 | 1 | 0 | √ | | | √ | | | Red-Red | Red-Red |
| State 12 | 0 | 0 | 1 | | √ | | | | √ | Grn-Blu | Grn-Grn |

Figure 10A:
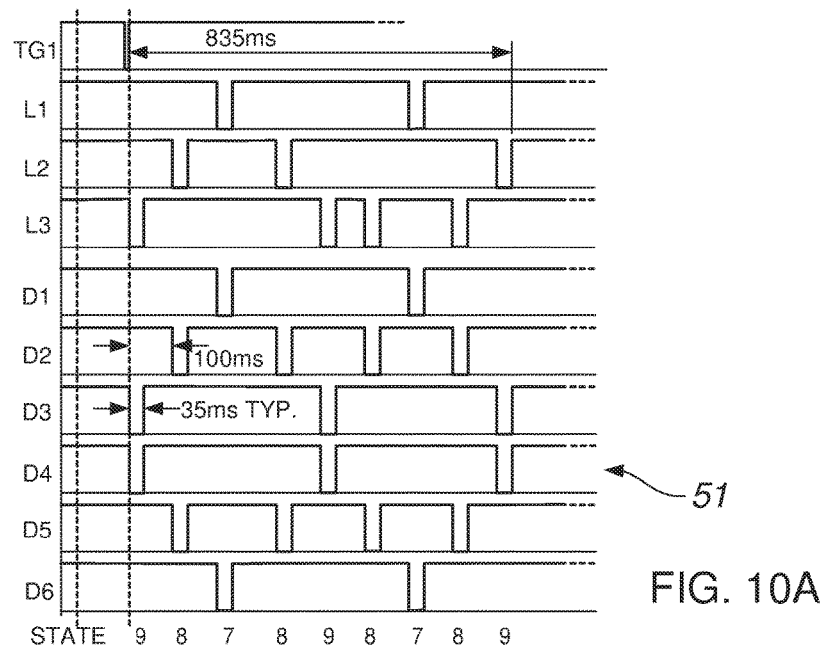
Figure 10B:
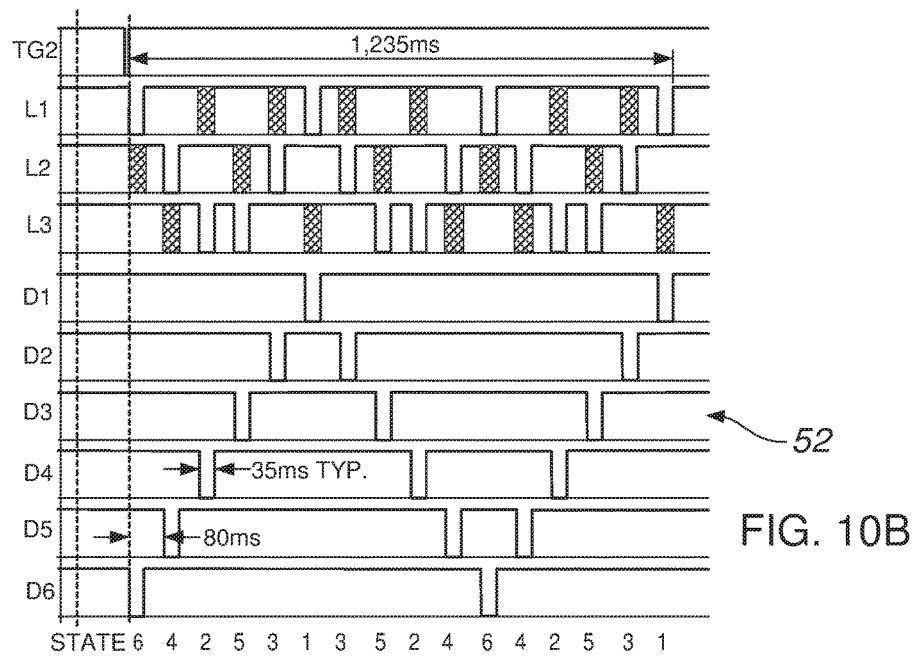

FIGS. 10A, 10B, 10C and 10D show a flash sequence combination in which a first operation of the switch 18 produces a counterpart of the first trigger pulse TG1 that initiates an eighth flash sequence 51 as shown in FIG. 10A in which pairs of the light sources, namely light sources D3 and D4, D2 and D5, and then D1 and D6 are activated for 35 ms at intervals of 100 ms. This is followed by corresponding activations of the light source pairs D2 and D5, D3 and D4, D1 and D6, D2 and D5, and finally D3 and D4 during an elapsed time of 835 ms. This is accomplished by the control apparatus 14 activating the control signal lines L1, L2, and L3 according to the states 7, 8, and 9 of Table 3 as also indicated in FIG. 10A. The final activation of the pair D3 and D4 can terminate the sequence, or preferably also be the beginning of endless or a predetermined number of repetitions of this pattern, until interrupted by a subsequent activation of the trigger switch 18 that produces a counterpart of the second trigger signal TG2 for initiating a different flashing sequence such as a ninth sequence 52 as shown in FIG. 10B. FIG. 10B shows individual activations which can also be for 35 ms, at intervals of 80 ms. These activations are in the sequence D6, D5, D4, D3, D2, D1, then D2, D3, D4, D5, D6, followed by D5, D4, D3, D2, and D1 during an elapsed time of 1,235 ms. This is accomplished by the control apparatus 14 activating the control signal lines L1, L2, and L3 according to the states 1-6 of Table 2 as also shown in FIG. 10B. The final activation of the light source D1 can terminate the sequence, or preferably also be the beginning of endless or a predetermined number of repetitions of this pattern, until interrupted by a subsequent activation of the switch 18 that produces another trigger signal for initiating a different flashing sequence which can be the eighth sequence 51 according to FIG. 10A. FIGS. 10C and 10D show further modes, designated tenth flash sequence 53 and eleventh flash sequence 54, respectively as activated by respective counterpart trigger signals TG3 and TG4, in which light source pairs are activated for extended periods, either terminated by a predetermined elapsed time or by subsequent activations of the trigger switch 18. The tenth flash sequence 53 of FIG. 10C activates the light sources D3 and D6 (both green) indefinitely or for a predetermined period; the eleventh flash sequence 54 of FIG. 10D activated the light sources D2 and D4 (both red), also indefinitely or for a predetermined period, until terminated by a subsequent activation of an ON/Off switch (not shown), which can be connected in series with the BAT terminal (1) of the control chip 16, or through the USB_IN socket 25.

Although the present invention has been described in considerable detail with reference to certain preferred versions thereof, other versions are possible. Therefore, the spirit and scope of the appended claims should not necessarily be limited to the preferred versions contained herein.

What is claimed is:

1. A light set circuit comprising four polarized light sources and first, second, and third control signal lines arranged in parallel, two of the light sources being connected in reverse polarity with each other between the first and second control signal lines, the other two light sources being connected in reverse polarity with each other between the second and third control signal lines,
   a) whereby one of the light sources is selectively activated when opposite signals are applied between the first and second control signal lines, the third control signal line being kept in a floating state, a different light source being activated when the signals are reversed with the third control signal line remaining in the floating state, and
   b) whereby another of the light sources is activated when opposite signals are applied between the second and third control signal lines, the first control signal line being in a floating state, a still different light source being activated when these signals are reversed with the first control signal remaining in the floating state.

2. The light set circuit of claim 1, wherein the four light sources are respectively a first LED light source, a second LED light source, a third LED light source and a fourth LED light source, wherein, the first LED light source and the second LED light source are connected in reverse polarity with each other between the second control signal line and the third control signal line, the third LED light source and the fourth LED light source being connected in reverse polarity with each other between the first control signal line and the second control signal line.

3. The light set circuit of claim 2, wherein each LED light source has a positive terminal and a negative terminal, the positive terminal of the first LED light source being connected to the third control signal line, and the negative terminal of the first LED light source being connected to the second control signal line, the positive terminal of the second LED light source being connected to the second control signal line, the negative terminal of the second LED light source being connected to the third control signal line, the positive terminal of the third LED light source being connected to the first control signal line, the negative terminal of the third LED light source being connected to the second control signal line, the positive terminal of the fourth LED light source being connected to the second control signal line, and the negative terminal of the fourth LED light source being connected to the first control signal line.

4. A light strip comprising a plurality of light set circuits, each light circuit being as claimed in claim 1, the light set circuits being sequentially connected along the first, second, and third control signal lines only.

5. The light strip of claim 4, wherein the plurality of light set circuits have equal complements of LED light sources and corresponding connections to the control signal lines at respective light points.

6. The light strip of claim 4, in combination with a control apparatus having three control outputs that are respectively connected to the three control signal lines of the light strip, the control apparatus being configured for selectively applying opposite signals of selected polarity between the first and second control signal lines, the third control signal line being in a floating state, and alternatively, applying opposite signals of selected polarity between the second and third control signal lines, the first control signal line being in a floating state.

7. The light strip combination of claim 6, wherein the control apparatus comprises a memory, a control pulse generating circuit and a processor, the memory being connected to the processor for storing flashing mode control information defining plural flashing modes of the light strip, the processor transferring the flashing mode control information from the memory to the control pulse generating circuit, the control pulse generating circuit sending corresponding pulse control signals to the first, second, and third control signal lines of the light strip.

8. The light strip combination of claim 7, wherein the memory, the control pulse generating circuit and the processor are formed in a control chip that further comprises an I/O port, the control apparatus further comprising a trigger switch connected to the I/O port, the processor responding to a switching signal of the trigger switch by transferring flashing mode control information of a different flashing mode from the memory to the control pulse generating circuit.

9. The light strip combination of claim 8, wherein the trigger switch is a flicker switch.

10. The light strip combination of claim 6, wherein the plurality of light set circuits of the light strip have equal complements of the LED light sources and corresponding connections to the control signal lines at respective light points.

11. The light strip combination of claim 7, wherein at least one of the flashing modes is a following flashing mode.

12. The light set circuit of claim 1, further comprising an additional pair of polarized light sources connected in reverse polarity with each other between the first and third control signal lines, whereby one light source of the additional pair is activated when opposite signals are applied between the first and third control signal lines, the second control signal line being in a floating state, the remaining light source of the additional pair being activated when the signals are reversed, the second control signal remaining in the floating state.

13. The light set circuit of claim 12, having first and second light points sequentially connected along the three control signal lines, one of the polarized light sources of each reverse-connected pair being included in the first light point, the remaining light source of each pair being included in the second light point.

14. The light set circuit of claim 13, wherein each light point includes three different color LED light sources respectively, each LED light source having a positive and a negative terminal.

15. The light set circuit of claim 14, wherein:
a) the first light point includes a first LED light source, a second LED light source and a third LED light source, the positive terminal of the first LED light source being connected to the second control signal line, the negative terminal of the first LED light source being connected to the first control signal line, the positive terminal of the second LED light source being connected to the second control signal line, the negative terminal of the second LED light source being connected to the third control signal line, the positive terminal of the third LED light source being connected to the first control signal line, and the negative terminal of the third LED light source is connected with the third control signal line; and
b) the second light point includes a fourth LED light source, a fifth LED light source and a sixth LED light source, the negative terminal of the fourth LED light source being connected to the second control signal line, and the positive terminal of the fourth LED light source being connected to the third control signal line, the negative terminal of the fifth LED light source being connected to the second control signal line, the positive terminal of the fifth LED light source being connected to the first control signal line, the negative terminal of the sixth LED light source being connected to the first control signal line, and the positive terminal of the sixth LED light source being connected with the third control signal line.

16. The light set circuit of claim 15, wherein each of the first and second light points include a red LED light source, a green LED light source and a blue LED light source.

17. The light set circuit of claim 15, wherein the first LED light source and the fourth LED light source are the same color, the second LED light source and the fifth LED light source are the same color, and the third LED light source and the sixth LED light source are the same color.

18. A light strip comprising a plurality of light set circuits, each light set circuit being as claimed in claim 13, the light set circuits being sequentially connected along the first, second, and third control signal lines.

19. The light strip of claim 18, wherein the plurality of light set circuits of the light strip have equal complements of the LED light sources and corresponding connections to the control signal lines at respective light points.

20. The light strip of claim 18 in combination with a control apparatus having three control outputs that are respectively connected to the three control signal lines of the light strip, the control apparatus being configured for selectively applying opposite signals of selected polarity between a selected pair of the three control signal lines, the remaining control signal line being in a floating state.

21. The light strip combination of claim 20, wherein the control apparatus comprises a memory, a control pulse generating circuit and a processor, the memory being connected to the processor and storing flashing mode control information for flashing modes of the light strip, the control pulse generating circuit being connected to the processor, for transferring the flashing mode control information to the three control signal lines of the light strip, the control apparatus further comprising a flicker switch connected to the processor through an I/O port for signaling the processor to access different flashing mode control information from the memory corresponding to a flash mode different from a current flashing mode.

22. The light set circuit of claim 14, wherein:
a) the first light point includes a first LED light source, a second LED light source and a third LED light source, the positive terminal of the first LED light source being connected to the second control signal line, the negative terminal of the first LED light source being connected to the first control signal line, the positive terminal of the second LED light source being connected to the third control signal line, the negative terminal of the second LED light source being connected to the second control signal line, the positive terminal of the third LED light source being connected to the first control signal line, and the negative terminal of the third LED light source is connected with the third control signal line; and b) the second light point includes a fourth LED light source, a fifth LED light source and a sixth LED light source, the negative terminal of the fourth LED light source being connected to the third control signal line, and the positive terminal of the fourth LED light source being connected to the second control signal line, the negative terminal of the fifth LED light source being connected to the second control signal line, the positive terminal of the fifth LED light source being connected to the first control signal line, the negative terminal of the sixth LED light source being connected to the first control signal line, and the positive terminal of the sixth LED light source being connected with the third control signal line.

23. The light set circuit of claim 22, wherein each of the first and second light points include a red LED light source, a green LED light source and a blue LED light source.

24. The light set circuit of claim 23, wherein the first LED light source and the fourth LED light source are the same color, the second LED light source and the fifth LED light source are the same color, and the third LED light source and the sixth LED light source are the same color.

25. The light set circuit of claim 23, wherein the first LED light source and the fourth LED light source are the same color, the second LED light source and the sixth LED light source are the same color, and the third LED light source and the fifth LED light source are the same color.

26. The light strip combination of claim 6, in further combination with an article of clothing.

27. The light strip combination of claim 26, wherein the article of clothing is a shoe lower portion.

* * * * *